(12) United States Patent
Hansen et al.

(10) Patent No.: US 7,344,313 B2
(45) Date of Patent: Mar. 18, 2008

(54) TAPER LOCK BEARING ASSEMBLY

(75) Inventors: Kurt Lee Hansen, Medina, OH (US); Donald Grimmond Yorston, Bellingham, WA (US); Roger David Crowle, Bellingham, WA (US)

(73) Assignee: QM Holdings Ltd., Delta, British Columbia, CA (US)

( * ) Notice: Subject to any disclaimer, the term of this patent is extended or adjusted under 35 U.S.C. 154(b) by 822 days.

(21) Appl. No.: 10/850,601

(22) Filed: May 19, 2004

(65) Prior Publication Data

US 2005/0259905 A1    Nov. 24, 2005

(51) Int. Cl.
    *F16C 43/00*   (2006.01)
(52) U.S. Cl. ..................... 384/538; 384/540
(58) Field of Classification Search ............ 384/538, 384/540; 403/370
    See application file for complete search history.

(56) References Cited

U.S. PATENT DOCUMENTS

| | | | |
|---|---|---|---|
| 718,376 A * | 1/1903 | O'Reilly | 384/540 |
| 929,762 A * | 8/1909 | Hess | 384/538 |
| 1,026,463 A * | 5/1912 | Schneider | 384/520 |
| 1,116,845 A | 11/1914 | Rogers | |
| 1,380,708 A | 6/1921 | Ford | |
| 1,524,999 A * | 2/1925 | Sandberg | 384/538 |
| 1,759,640 A | 5/1930 | Brunner et al. | |
| 2,045,896 A * | 6/1936 | Brusca | 384/540 |
| 2,764,437 A | 9/1956 | Bratt | |
| 3,709,575 A | 1/1973 | Howe, Jr. | |
| 3,806,215 A | 4/1974 | Price et al. | |
| 3,816,013 A | 6/1974 | Schuhmann | |
| 3,912,412 A | 10/1975 | Struttman | |
| 3,918,779 A | 11/1975 | Hallinger et al. | |
| 4,596,477 A | 6/1986 | Lundgren | |
| 4,916,750 A | 4/1990 | Scott | |
| 5,011,306 A | 4/1991 | Martinie | |
| 5,211,488 A * | 5/1993 | Patz et al. | 384/584 |
| 5,489,156 A | 2/1996 | Martinie | |
| 5,582,482 A | 12/1996 | Thom, Jr. et al. | |
| 5,685,650 A | 11/1997 | Martinie et al. | |
| 5,876,127 A | 3/1999 | Casey | |
| 5,897,214 A | 4/1999 | Nisley | |
| 6,152,604 A | 11/2000 | Ostling et al. | |
| 6,425,690 B1 | 7/2002 | DeWachter | |
| 2003/0099418 A1 | 5/2003 | Ostling et al. | |

* cited by examiner

*Primary Examiner*—Thomas R. Hannon
*Assistant Examiner*—Justin Krause
(74) *Attorney, Agent, or Firm*—Knobbe Martens Olson & Bear LLP

(57) ABSTRACT

A bearing assembly lockable onto a shaft. The bearing assembly comprises a first tapered adapter defining a first axial bore for the receipt of the shaft which has an outer, annular tapered surface. There is a second tapered adapter defining a second axial bore for receipt of a sleeve portion of the first adapter. The second tapered adapter has an outer, annular tapered surface tapered at a taper angle opposite to that of the first tapered adapter such that the first and second tapered adapters co-operate to define an outer annular surface having a generally V-shaped configuration that tapers from spaced greater diameter outer ends to adjacent lesser diameter inner ends. The opposed tapered surfaces have a fixed limit in their axial travel toward each other along the shaft defined by engagement of the lesser diameter inner ends. When the tapered surfaces reach the end of their travel, the bearing supported on the tapered surfaces is tightened on the shaft with the correct clearances.

16 Claims, 3 Drawing Sheets

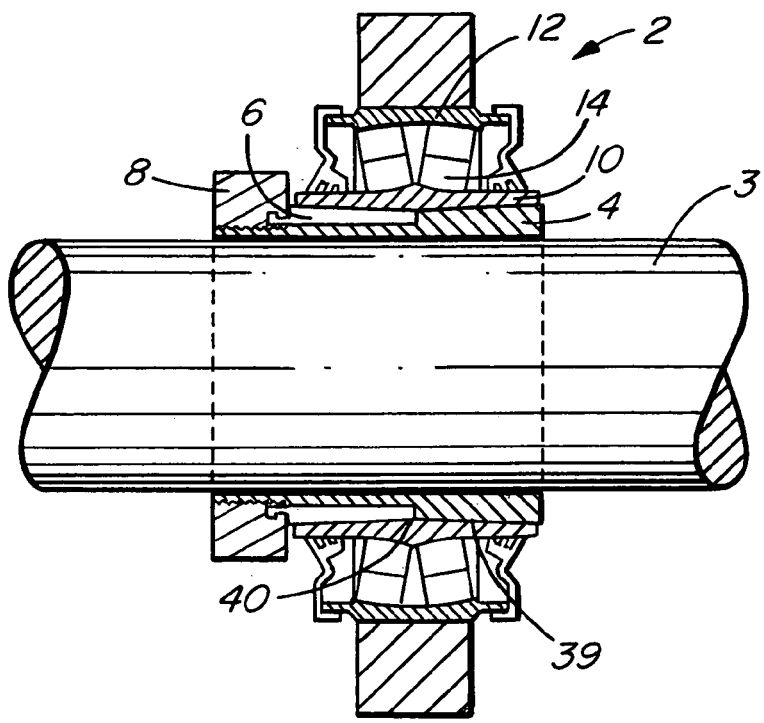
FIG. 1
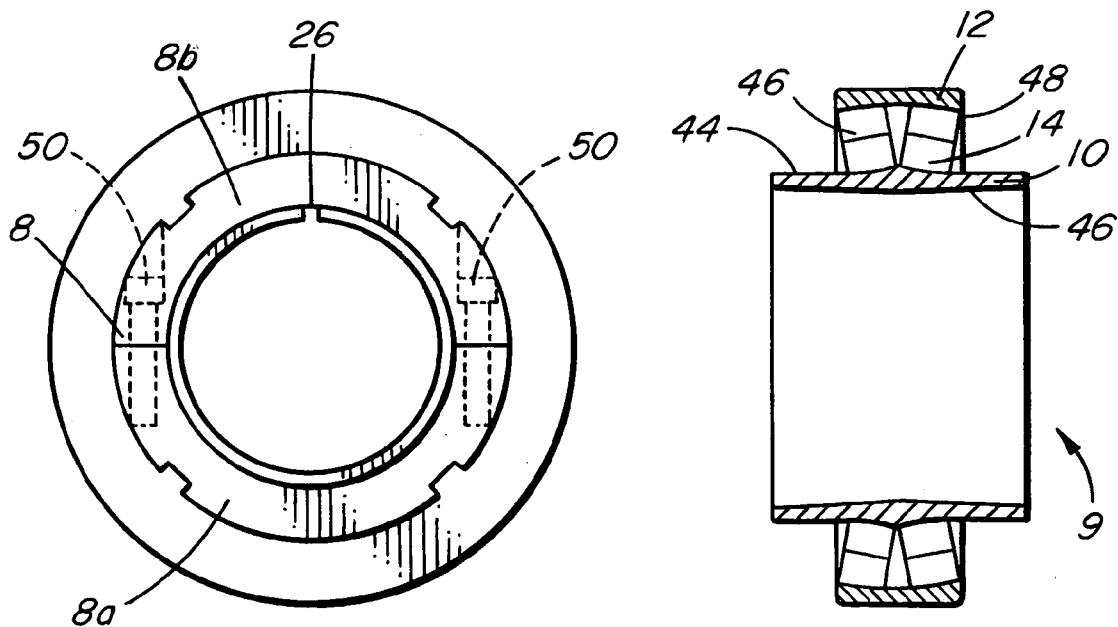
FIG. 1a
FIG. 2

TAPER LOCK BEARING ASSEMBLY

FIELD OF INVENTION

This invention relates to the general field of bearings, and more particularly, to a clamping arrangement and bearing assembling for mounting to a shaft.

BACKGROUND OF THE INVENTION

Bearing assemblies are present whenever rotary motion of a machine part is required. Bearing assemblies are often available as mounted bearings which are bearings that are installed in preconfigured housings. Such an arrangement simplifies machine design as the problems of bearing contamination and maintaining the bearing in contact with a shaft are solved for the machine designer who can select and purchase an off-the-shelf mounted bearing package with a housing that has mounting holes, seals, a bearing and a locking system to hold the bearing to the shaft.

Examples of prior bearing assemblies and locking systems known to the inventors include those disclosed in the following:
- U.S. Pat. No. 1,116,845 to Rogers
- U.S. Pat. No. 1,380,708 to Ford
- U.S. Pat. No. 1,759,640 to Brunner et al.
- U.S. Pat. No. 2,764,437 to Bratt;
- U.S. Pat. No. 3,709,575 to Howe, Jr.
- U.S. Pat. No. 3,806,215 to Price et al.
- U.S. Pat. No. 3,816,013 to Schuhmann
- U.S. Pat. No. 3,912,412 to Struttmann
- U.S. Pat. No. 3,918,779 to Halliger et al.
- U.S. Pat. No. 4,596,477 to Lundgren
- U.S. Pat. No. 4,916,750 to Scott
- U.S. Pat. No. 5,011,306 to Martinie
- U.S. Pat. No. 5,489,156 to Martinie
- U.S. Pat. No. 5,582,482 to Thom, Jr, et al.
- U.S. Pat. No. 5,685,650 to Martinie et al.
- U.S. Pat. No. 5,876,127 to Casey
- U.S. Pat. No. 5,987,214 to Nisley
- U.S. Pat. No. 6,152,604 to Ostling et al.
- U.S. Pat. No. 6,425,690 to DeWatcher, and
- U.S. Published application No. 2002/009418 to Ostling et al.

Bearing assemblies that incorporate spherical roller bearings are a preferred form of assembly. Spherical roller bearing assemblies employ cylindrical rollers turning between two races to permit relative rotation of parts associated with each race. The advantage of spherical roller bearings is that they can accommodate both radial and axial loads at high loading levels and also accept some misalignment. These features make mounted spherical roller bearings, the preferred choice for any machine that must handle heavy loads at low or intermediate speeds. Mounted spherical roller bearings are found in all heavy industry from forestry to steel manufacturing to automotive assembly lines and food processing. They are used in power plants, scrap yards, mines sand and gravel operations and almost any industry.

One of the biggest problems in designing a mounted bearing is coming up with a locking system to hold the bearing tight to the shaft. A spherical roller bearing will accept thrust loads in both axial and radial directions, but this is of no benefit if the bearing slide on the shaft when an axial load is applied. One solution to this problem is to include an eccentric locking collar to hold the bearing housing to the shaft. The drawback of the eccentric locking collar becomes apparent when it is necessary to remove the bearing. Generally, bearings located by eccentric locking collars can only be removed with a cutting torch if they have been in service for any reasonable period. This is a significant problem if the bearings are mounted to expensive machinery that requires dismantling for maintenance or repairs. Removal by cutting torch also tends to damage the bearing such that an otherwise serviceable bearing must be replaced during each maintenance operation.

Tapered adapter mounted bearings are a different solution to the problem of locking a bearing housing to a shaft. These bearings use a tapered adapter comprising a tapered sleeve that is pulled or pushed into a bearing housing with a tapered bore. The tapered sleeve and bore create an interference wedge fit that locks the bearing housing to the shaft. The further the sleeve is inserted into the bore, the tighter the interference fit becomes. Tapered adapter mounted bearings are fairly easily removed from the shaft by pushing the bearing in reverse against the taper.

There are also drawbacks to current tapered adapter mounted bearings including:

1) the insertion of the tapered sleeve into the tapered bore of the bearing housing reduces the running clearance of the bearing. It is difficult to know how far to insert the tapered sleeve to lock the bearing housing on the shaft without adversely affecting the performance of the bearing by reducing clearance such that the bearing overheats during normal operation. Currently, the best method to alleviate this problem is to use feeler gauges between the rollers and the races when installing the bearing on the shaft to monitor clearance.

2) the tapered adapter serves to hold the shaft well in applications with high radial loads, however, performance with respect to axial loads is less impressive. The tapered adapter will only accept limited axial loads before slippage along the shaft may occur.

3) the tightening of the tapered adapter will axially preload the bearing if the bearing housing is held firmly in place.

SUMMARY OF THE INVENTION

To address the foregoing problems, the present invention provides a novel clamping arrangement and bearing assembly that uses a pair of tapered adapters to define an annular surface having a V-shaped configuration for locking an inner ring member of a bearing to a shaft.

Accordingly, the present invention provides a bearing assembly lockable onto a shaft, the bearing assembly comprising:

a first tapered adapter defining a first axial bore for the receipt of the shaft, and having an outer, annular tapered surface with a sleeve portion extending therefrom;

a second tapered adapter defining a second axial bore for receipt of the sleeve portion of the first adapter; and having an outer, annular tapered surface at a taper angle opposite to that of the first taper adapter;

whereby the first and second tapered adapters are introducible from opposite sides of the bearing assembly and movable toward each other within a bearing inner ring member such that the first and second tapered adapters co-operate to define an outer annular surface having a generally V-shaped configuration, the bearing inner ring member having an inner surface for engagement with the generally V-shaped configuration of the outer annular surface in order to establish a locking interference fit between the shaft, the first and second adapters and the inner surface of the bearing inner ring member.

The present invention also provides a bearing assembly lockable onto a shaft, the bearing assembly comprising:

a bearing assembly lockable onto a shaft, the bearing assembly comprising:

a first tapered adapter defining a first axial bore for the receipt of the shaft, and having an outer, annular tapered surface tapered from a greater diameter outer end to a lesser diameter inner end with a sleeve portion extending axially from the lesser diameter inner end of the adapter;

a second tapered adapter defining a second axial bore for receipt of the sleeve portion of the first adapter; and having an outer, annular tapered surface tapered from a greater diameter outer end to a lesser diameter inner end at a taper angle opposite to that of the first tapered adapter such that the first and second tapered adapters co-operate to define an outer annular surface having a generally V-shaped configuration that tapers from greater diameter outer edges to adjacent lesser diameter inner edges;

a bearing inner ring member defining an inner raceway about an outer surface and having an inner axial bore having an inner surface for engagement with the outer annular surface defined by the first and second tapered adapters;

a bearing outer race member defining an outer raceway about an inner surface and positionable radially outwardly of the inner raceway and in sustantially axial alignment therewith;

a plurality of bearing elements disposed between said bearing inner raceway and said bearing outer raceway to guide relative motion of the bearing outer raceway with respect to the bearing inner raceway; and a locking member having a first axial portion for engaging the sleeve portion of the first tapered adapter and second axial portion for engaging the second tapered adapter to join the first and second tapered adapters to effect relative axial movement therebetween in order to establish a locking interference fit between the shaft, the first and second adapters and the inner surface of the bearing inner ring member.

In a further aspect, the present invention provides a clamping arrangement for attaching a bearing to a shaft comprising:

a first tapered adapter defining a first axial bore for the receipt of the shaft, and having an outer, annular tapered surface tapered from a greater diameter outer end to a lesser diameter inner end with a sleeve portion extending axially from the lesser diameter inner of the adapter;

a second tapered adapter defining a second axial bore for receipt of the sleeve portion of the first adapter; and having an outer, annular tapered surface tapered from a greater diameter outer end to a lesser diameter inner end at a taper angle opposite to that of the first tapered adapter such that the first and second tapered adapters co-operate to define an outer annular surface having a generally V-shaped configuration that tapers from greater diameter outer ends to adjacent lesser diameter inner ends; and a locking member having a first axial portion for engaging the sleeve portion of the first tapered adapter and second axial portion for engaging the second tapered adapter to join the first and second tapered adapters to effect relative axial movement therebetween in order to establish a locking interference fit between the shaft, the first and second adapters and a bearing inner ring member fitted over the first and second tapered adapters.

Preferably, the tapered first and second adapters have a fixed limit to their travel along the shaft toward each other defined by annular shoulders formed at the opposed lesser diameter inner ends of the tapered outer surfaces. When the annular shoulders inter engage at the valley of the V-shaped outer annular surface to limit further travel, the inner raceway of the bearing is locked to the shaft and the bearing automatically has the correct clearance without requiring clearance measurement.

The locking member is preferably a split nut formed from at least two segments. As well as pulling the tapered adapters toward each other within the bearing, the two segments of the split nut can be tightened about the shaft to provide further clamping force to hold the bearing in place on the shaft in addition to the interference clamping force of the tapered adapters.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Aspects of the present invention are illustrated, merely by way of example, in the accompanying drawings in which:

FIG. 1 is an assembled side elevation view with cutaway sections showing a first embodiment of the bearing assembly of the present invention using a single locking member in the form of a locking nut;

FIG. 1a is an end view from the left side of the assembly of FIG. 1 showing a locking nut that can be used with the present invention;

FIG. 2 is cross-sectional view through the inner and outer raceway of the bearing to be anchored to the shaft;

DESCRIPTION OF THE PREFERRED EMBODIMENTS

Figure 3:
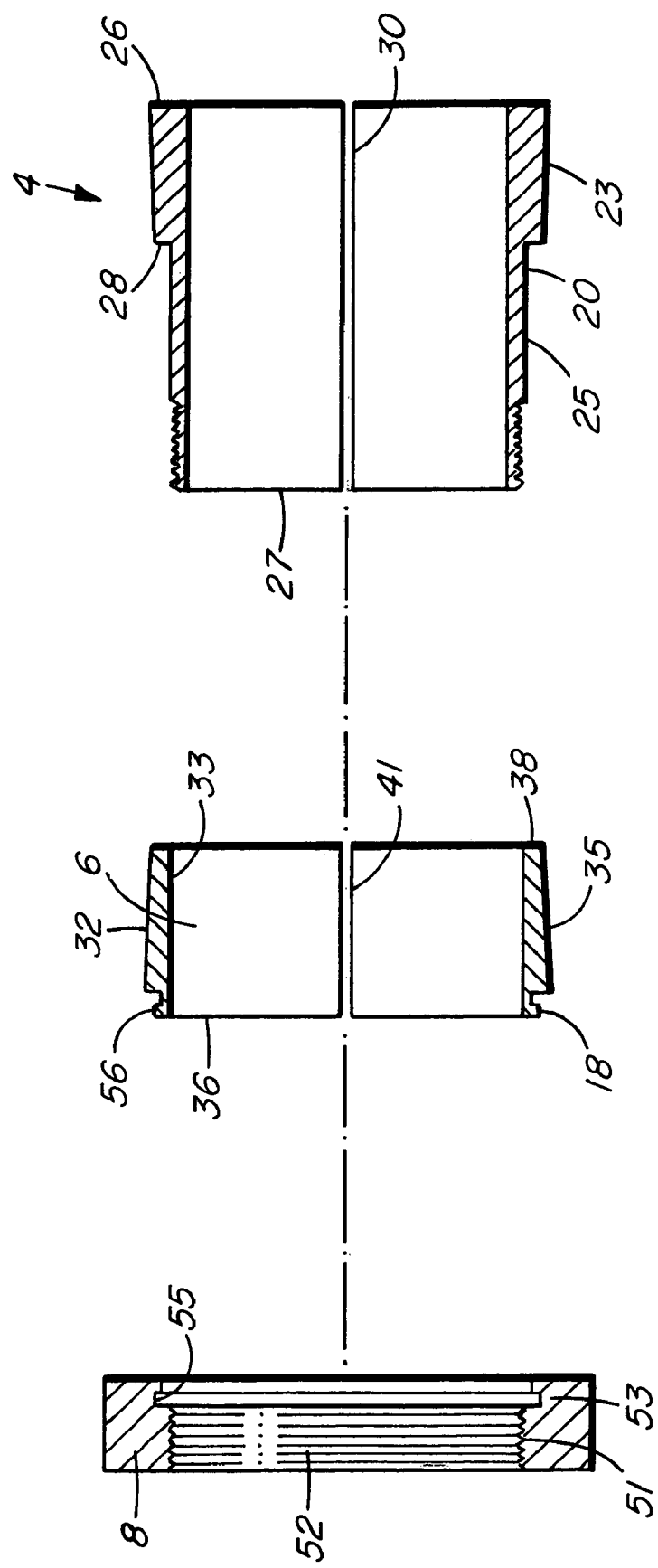
FIG. 3 is an exploded view of the bearing assembly of the present invention showing first tapered adapter, the second tapered adapter and the locking nut.

Referring to FIG. 1, there is shown in elevation with cutaway sections a first embodiment of the bearing assembly 2 according to the present invention installed and clamped in place on a shaft 3. The clamping arrangement is shown in isolation in FIG. 3 and comprises first and second tapered adapter members 4 and 6, respectively, fitted over shaft 3 and joined together by a locking member in the form of split nut 8. The bearing structure 9 that is retained in place on shaft 3 by the clamping arrangement is shown in isolation in FIG. 2 and comprises a bearing inner ring member 10, a bearing outer race member 12 and a set of roller bearings 14 between the members to permit independent rotary motion of the outer race member with respect to the inner ring member which is locked to shaft 3.

As best shown in FIG. 3, first tapered adapter 4 comprises a generally cylindrical structure 20 defining a first axial bore 22 for the receipt of shaft 3. The generally cylindrical structure has an outer, annular tapered surface 23 forming a wedge element that is tapered from a greater diameter outer end 26 to a lesser diameter inner end 28. A substantially circular sleeve portion 25 extends axially from the lesser diameter inner end 28 of the adapter. Sleeve portion 25 includes external threads 27. Preferably, first tapered adapter 4 is formed with a radial slot 30 extending along its length to permit deformation of the adapter in order to shrink in diameter when compressed to tighten onto shaft 3.

Still referring to FIG. 3, there is shown second tapered adapter 6 which comprises a second generally cylindrical structure 32. Cylindrical structure 32 defines a second axial bore 33 to receive the sleeve portion 25 of first adapter 4. Second adapter 6 is also formed with an outer, annular tapered surface 35 that tapers from a greater diameter outer end 36 to a lesser diameter inner end 38. The taper angle of second adapter 6 is opposite to that of first tapered 4. Second adapter 6 is also preferably formed with a radial slot 41 extending along the length of the adapter.

When the first and second tapered adapters 4 and 6 are assembled together on shaft 3 as best shown in FIG. 1, the adapters co-operate to define an outer annular surface 39 having a generally V-shaped configuration that tapers from greater diameter outer ends 26,36 to adjacent lesser diameter inner ends 28,38 at a central annular valley 40.

Generally V-shaped outer surface 39 engages with bearing inner ring member 10 in an assembled bearing. Bearing inner ring member 10 defines an inner raceway about its outer surface 44 and has an inner axial bore 46 having an inner surface for engagement with outer annular surface 39 defined by the first and second tapered adapters. As is conventional, a plurality of bearing elements 46 are disposed between the bearing inner raceway and the bearing outer race member 12 to permit rotation of the outer raceway. In the illustrated embodiment, bearing elements 46 are rollers which are preferably held in a retainer 47. It will be apparent to a person skilled in the art that other types of bearing elements can be used with the clamping arrangement of the present invention. Bearing outer race member 12 defines an outer raceway 48 about an inner surface which is positionable radially outwardly of the inner raceway, and in substantially axial alignment therewith to permit relative motion of the bearing outer race member 12 with respect to the bearing inner ring member 10 when the inner ring member is locked to the shaft by the action of the clamping arrangement.

The first and second tapered adapters are secured in position on shaft 3 by a locking member preferably in the form of a nut 8. As best shown in FIG. 1a, which is an end view of the bearing assembly 2, nut 8 is preferably a split nut formed from at least two nut segments 8a and 8b. The nut segments are fastenable together using a conventional arrangement of threaded fasteners 50 tightenable into aligned threaded openings that extend through the two nut segments with one of the openings being threaded to engage fastener 50. As will be described in more detail below, nut 8 acts to join the first and second tapered adapters together to effect relative axial movement therebetween. Axial movement of the tapered adapters with respect to each other along the shaft is necessary in order to establish a locking interference fit between shaft 3, the outer annular surface 39 of V-shaped configuration formed by the tapered portions of the first and second adapters, and the inner axial bore 46 of bearing inner ring member 10.

As best shown in FIG. 3, split nut 8 includes a first axial portion 51 for engaging sleeve portion 25 of first tapered adapter 4. First axial portion 51 is formed with internal threads 52 which are adapted to engage external threads 27 formed on sleeve portion 25 such that rotation of the assembled nut acts to move the first tapered adapter 4 axially along shaft 3. Nut 8 also includes a second axial portion 53 for engaging the second tapered adapter. In the illustrated embodiment, second axial portion 53 is formed With an annular groove 55 adapted to engage and retain a complementary annular flange 56 formed on second tapered adapter 6. It will be readily apparent to a person skilled in the art that the positions of flange 56 and groove 55 can be reversed. Engagement of flange 56 in groove 55 acts to lock nut 8 and second tapered adapter 6 together with respect to axial movement along shaft 3 while still permitting relative rotation of the two parts.

When the two tapered adapters 4,6 and nut 8 are assembled on shaft 3 as shown in FIG. 1, rotation of nut 8 acts to thread internal nut threads 52 within external threads 27 of first tapered adapter 4 to move the first adapter axially along shaft 3 with respect to the second adapter. Nut 8 is fixed axially with respect to second adapter 6, but able to rotate relative to the second adapter by virtue of the flange 56 and groove 55 arrangement described above. Therefore, rotation of nut 8 can be used to draw the oppositely angled, outer tapered surfaces 23,35 of the tapered adapters together within a bearing in order to create an interference wedge fit within the inner ring member 10 of the bearing to lock the bearing to shaft 3. Furthermore, fasteners 50 of split nut 8 can be subsequently tightened further to provide additional anchoring force to hold the first and second tapered adapters to the shaft to prevent axial movement along the shaft. This additional anchoring force combined with the anchoring force generated by the interference fit of the tapered surfaces allows the bearing assembly of the present invention to withstand increased axial loads along the shaft. It is anticipated that the axial load bearing ability of the bearing assembly of the present invention will raise the axial load rating to equal the maximum load acceptable to the bearing.

An important feature of the present invention is that the dual tapered surfaces of the first and second adapters automatically create the correct clearance for the bearing when used in conjunction with the specially formed bearing inner ring member 10 described above and a shaft of the appropriate diameter. The lesser diameter inner ends of the first and second tapered adapters are each formed with a radially extending shoulder that defines a limit to axial travel of the first and second tapered adapters toward each other on the shaft by inter-engagement of the shoulders. When the shoulders abut, the tapered surfaces and bearing inner ring member 10 are designed and dimensioned to generate a interference fit sufficient to reliably lock the bearing assembly to the shaft while automatically positioning the inner raceway of the inner ring member a distance from the shaft that achieves the correct bearing clearance. This arrangement also avoids pre-loading of the bearings.

When designing tapered bearings, it is possible for designers to establish a ratio between the amount of running clearance (transverse to the axis of the shaft) that a bearing will give up and the distance the tapered adapter moves into the bore (along the axis of the shaft) after full contact is made between the tapered adapter and the inner race. Therefore, it is possible to determine how much axial movement of the tapered adapter will result in a given reduction of the radial clearance of the bearing. Given that a bearing can operate satisfactorily over a range of running clearance, then the axial movement of the tapered adapters of the present invention will work satisfactorily over a range of shaft diameters. The tapered bearing of the present invention provides a limit to the axial movement of the tapered adapters by virtue of the two opposing tapered adapters engaging each other from opposite sides of the bearing to create a stop position. This is unlike conventional tapered bearings that have no limit to the axial movement of the tapered adapter through the bearing bore.

The wedging arrangement of the present invention also offers the advantage that no pre-loading of the bearing occurs. Two opposing tapered surfaces being pulled into a bearing inner ring member from opposite sides of the bearing avoids axial pre-loading of the bearing. With conventional tapered bearings, it is difficult to locate a bearing precisely at a particular location on a shaft as there is a tendency when tightening the tapered adapter to pull the bearing axially along the shaft towards the nut on the adapter. If the bearing housing is in a fixed position, then tightening of the adapter results in axial pre-loading of the bearing with conventional tapered bearing designs. The design of the present invention avoids this problem by having the tapered adapters enter the bearing from opposite sides in opposite directions.

Figure 4:
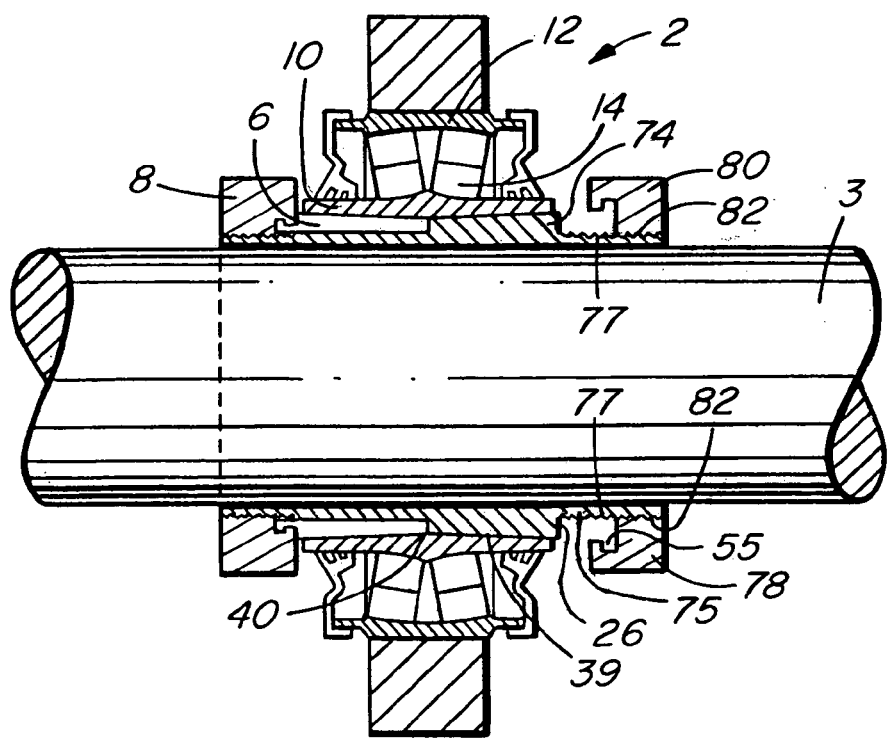
FIG. 4 is an assembled side elevation view with cutaway sections showing a second embodiment of the bearing assembly of the present invention which uses two locking nuts.

FIG. 4 shows an alternative embodiment of the bearing assembly of the present invention which employs a pair of locking nuts to retain the assembly on the shaft. In the second embodiment, parts identical to those of the first embodiment are identically labelled. The second embodiment employs a modified first tapered adapter 74 that a second sleeve portion 75 extending from the greater diameter outer end 26 of the adapter opposite to the first sleeve portion 25. Second sleeve portion 75 is adapted to receive a second locking member 78 for exerting a clamping force on the second sleeve portion to assist in retaining the bearing assembly on shaft 3. Preferably, the second locking member 78 is a second split nut 80 having an axial portion with internal threads 82 to engage external threads 77 formed on second sleeve portion 75. Second split nut 80 is formed from at least two nut segments that are tightenable together about the shaft using transversely extending fasteners between nut segments to provide additional anchoring force to hold the bearing assembly to the shaft. In the illustrated embodiment, second split nut 80 is identical to the first split nut 8 of the first embodiment to the extent that the second split also includes a groove 55. In fact, in the second split nut, this groove is unnecessary and unused and is illustrated to emphasize that the two split nuts are preferably identical to reduce the number of different parts. Second split nut 80 is preferably rotated into position on threads 77 to abut the bearing housing (which defines a convenient stop location) prior to the nut segments of the second split nut being tightened together for their clamping effect on shaft 3.

It will be apparent to a person skilled in the art that the second locking member 78 can also be a conventional clamping member such as a hose clamp or the like that engages a non-threaded second sleeve portion 75.

Installation of the bearing assembly of the present invention involves inserting first adapter 4 positioned over shaft 3 through the internal bore of inner ring member 10. The cylindrical sleeve 25 of first tapered adapter 4 is dimensioned to protrude from the opposite side of the bearing a sufficient distance to position external threads 27 to be engageable with internal threads 52 of split nut 8. Second tapered adapter 6 is then slid along shaft 3 into position within the internal bore of inner ring member 10 from the opposite side of the bearing over sleeve 25. The nut segments 8a and 8b of split nut 8 are then installed about shaft 3 so that groove 55 engages flange 56 of the second adapter. Fasteners 50 are tightened to form split nut 8 into a single unit. Split 8 is then rotated so that nut internal threads 52 engage first adapter external threads 27 which serves to draw the tapered surfaces of the adapters together within the inner ring member 10 of the bearing. Nut 8 is rotated until the inner shoulders of the tapered adapters abut each other at which point the tapered surfaces are positioned to create an interference fit between the inner ring member and the shaft that reliably lock the bearing assembly into place and at the same time positions the inner ring member a distance from the shaft that provides appropriate bearing clearance. Fasteners 50 can be tightened further to provide additional clamping force to maintain the bearing assembly in place on the shaft.

In the case of the second embodiment of FIG. 4, installation is identical to that of the first embodiment except for the additional step of applying the second locking member to the second sleeve portion of the first tapered adapter and clamping in place about the shaft.

Removal of the bearing assembly involves loosening of the second locking member in the case of the second embodiment. Then, split nut 8 is released by loosening fasteners 50, and rotating nut 8 to draw apart the tapered adapters.

Figure 5:
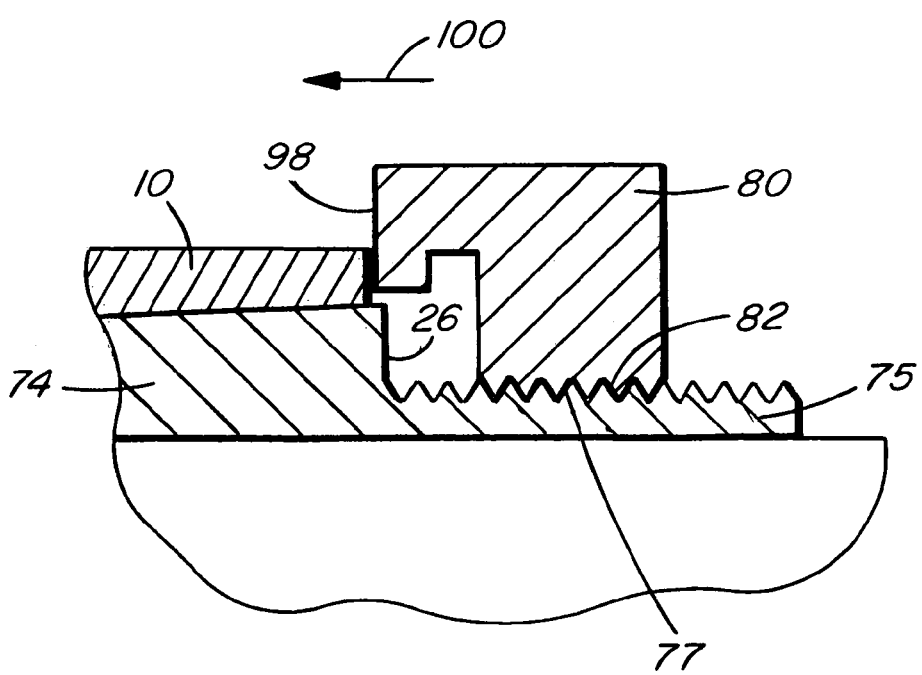
FIG. 5 is a detail view showing the manner in which the second locking nut can be used in conjunction with the first tapered adapter and the inner race member to assist in removal of the first tapered adapter from the bearing.

In the case of the second embodiment of FIG. 4, withdrawal of the first tapered adapter 4 can be assisted using the second split nut 80. FIG. 5 is a detail view showing that second nut 80 is preferably dimensioned to clear the greater diameter outer end 26 of the first tapered adapter to directly engage inner race member 10. After the first locking nut 8 has been removed from second tapered adapter 6, second nut 80 can be rotated on threads 77 of second sleeve 75 of first tapered adapter 74 to cause the nut to move in the direction indicated by arrow 100. This results in the inner face 98 of nut 80 and internal nut threads 82 applying forces that result in relative axial movement between the inner race member 10 and the tapered adapter 74. The applied force acts to withdraw the first tapered adapter 74 from the inner race member along shaft 3 as nut 80 is advanced along threads 77.

Although the present invention has been described in some detail by way of example for purposes of clarity and understanding, it will be apparent that certain changes and modifications may be practised within the scope of the appended claims.

We claim:

1. A bearing assembly lockable onto a shaft, the bearing assembly comprising:
   a first tapered adapter defining a first axial bore for the receipt of the shaft, and having an outer, annular tapered surface tapered from a greater diameter outer end to a lesser diameter inner end with a sleeve portion extending axially from the lesser diameter inner end of the adapter;
   a second tapered adapter defining a second axial bore for receipt of the sleeve portion of the first adapter; and having an outer, annular tapered surface tapered from a greater diameter outer end to a lesser diameter inner end at a taper angle opposite to that of the first tapered adapter such that the first and second tapered adapters co-operate to define an outer annular surface having a generally V-shaped configuration that tapers from greater diameter outer ends to adjacent lesser diameter inner ends;
   a bearing inner ring member defining an inner raceway about an outer surface and having an inner bore having an inner surface for engagement with the outer annular surface defined by the first and second tapered adapters;

a bearing outer race member defining an outer raceway about an inner surface and positionable radially outwardly of the inner raceway and in substantially axial alignment therewith;

a plurality of bearing elements disposed between said bearing inner raceway and said bearing outer raceway to guide relative motion of the bearing outer raceway with respect to the bearing inner raceway; and a locking member having a first axial portion for engaging the sleeve portion of the first tapered adapter and second axial portion for engaging the second tapered adapter to join the first and second tapered adapters to effect relative axial movement therebetween in order to establish a locking interference fit between the shaft, the first and second adapters and the inner surface of the bearing inner ring member.

2. The bearing assembly of claim 1 wherein the locking member is a nut having internal threads formed on the first axial portion and the sleeve portion of the first tapered adapter is formed with external threads engageable with the internal threads such that rotation of the nut acts to move the first tapered adapter axially along the shaft with respect to the nut.

3. The bearing assembly of claim 2 wherein one of the second axial portion of the nut and the second tapered adapter is formed with a flange and the other is formed with a complementary groove, the flange being engageable in the groove to lock the nut and the second tapered adapter together with respect to axial movement along the shaft while permitting relative rotation.

4. The bearing assembly of claim 2 wherein the nut is a split nut formed from at least two nut segments that are tightenable together about the shaft to provide additional anchoring force to hold the first and second tapered adapters to the shaft to prevent axial movement along the shaft.

5. The bearing assembly of claim 1 in which at least the first tapered adapter is formed with a slot extending axially along the length thereof.

6. The bearing assembly of claim 5 in which the second tapered adapter is formed with a slot extending axially along the length thereof.

7. The bearing assembly of claim 1 in which the lesser diameter inner ends of the first and second tapered adapters are each formed with a radially extending shoulder that defines a limit to axial travel of the first and second tapered adapters toward each other on the shaft by inter-engagement of the shoulders.

8. The bearing assembly of claim 1 in which the first tapered adapter includes a second sleeve portion extending from the greater diameter outer end of the adapter and a second locking member having an axial portion for engaging the second sleeve portion of the first tapered adapter.

9. The bearing assembly of claim 8 wherein the second locking member is a second nut having internal threads formed on the first axial portion, and the second sleeve portion of the first tapered adapter is formed with external threads engageable with the internal threads of the second locking member.

10. The bearing assembly of claim 9 wherein the second nut is a second split nut formed from at least two nut segments that are tightenable together about the shaft.

11. A clamping arrangement for attaching a bearing to a shaft comprising:

a first tapered adapter defining a first axial bore for the receipt of the shaft, and having an outer, annular tapered surface tapered from a greater diameter outer end to a lesser diameter inner end with a sleeve portion extending axially from the lesser diameter inner of the adapter;

a second tapered adapter defining a second axial bore for receipt of the sleeve portion of the first adapter; and having an outer, annular tapered surface tapered from a greater diameter outer end to a lesser diameter inner end at a taper angle opposite to that of the first tapered adapter such that the first and second tapered adapters co-operate to define an outer annular surface having a generally V-shaped configuration that tapers from greater diameter outer ends to adjacent lesser diameter inner ends;

a bearing inner ring member for defining an inner raceway about an outer surface thereof and having an inner bore having an inner surface formed with a complementary V-shaped configuration for engagement with the outer annular surface defined by the first and second tapered adapters; and a locking member having a first axial portion for engaging the sleeve portion of the first tapered adapter and second axial portion for engaging the second tapered adapter to join the first and second tapered adapters to effect relative axial movement therebetween in order to establish a locking interference fit between the shaft, the first and second adapters and the bearing inner ring member fitted over the first and second tapered adapters.

12. A bearing assembly lockable onto a shaft, the bearing assembly comprising:

a first tapered adapter defining a first axial bore for the receipt of the shaft, and having an outer, annular tapered surface with a sleeve portion extending therefrom;

a second tapered adapter defining a second axial bore for receipt of the sleeve portion of the first adapter; and having an outer, annular tapered surface at a taper angle opposite to that of the first taper adapter;

whereby the first and second tapered adapters are introducible from opposite sides of the bearing assembly and movable toward each other within a bearing inner ring member such that the first and second tapered adapters co-operate to define an outer annular surface having a generally V-shaped configuration, the bearing inner ring member having an inner surface for engagement with the generally V-shaped configuration of the outer annular surface in order to establish a locking interference fit between the shaft, the first and second adapters and the inner surface of the bearing inner ring member.

13. The bearing assembly as claimed in claim 12 in which the first and second tapered adapter tapers from greater diameter outer ends to lesser diameter inner ends with the first tapered adapter having a sleeve portion extending axially from the lesser diameter end, the lesser diameter inner ends defining stop surfaces that prevent axial movement of the tapered adapters when the lesser diameter inner ends abut each other.

14. The bearing assembly of claim 13 including a locking member having a first axial portion for engaging the sleeve portion of the first tapered adapter and a second axial portion for engaging the second tapered adapter to join the first and second tapered adapters to effect relative axial movement therebetween.

15. The bearing assembly as claimed in claim 12 in which the bearing inner ring member defines an inner raceway about an outer surface and has an inner bore having an inner surface for engagement with the outer annular surface defined by the first and second tapered adapters.

16. The bearing assembly as claimed in claim 15 including:

a bearing outer race member defining an outer raceway about an inner surface and positionable radially outwardly of the inner raceway and in substantially axial alignment therewith; and a plurality of bearing elements disposed between said bearing inner raceway and said bearing outer raceway to guide relative motion of the bearing outer raceway with respect to the bearing inner raceway.

* * * * *